United States Patent
Do et al.

(10) Patent No.: US 9,859,551 B2
(45) Date of Patent: Jan. 2, 2018

(54) ANODE FOR SECONDARY BATTERY COMPRISING ADDITIVE FOR IMPROVING LOW-TEMPERATURE CHARACTERISTICS, AND SECONDARY BATTERY HAVING THE SAME

(71) Applicant: LG CHEM, LTD., Seoul (KR)

(72) Inventors: Hyun-Kyung Do, Daejeon (KR); Yo-Jin Kim, Daejeon (KR); Woo-Ha Kim, Daejeon (KR); Soul-Gie Hong, Daejeon (KR); Joo-Young Choi, Daejeon (KR); Hyun-Soo Kwon, Daejeon (KR); Kang-Kun Kim, Daejeon (KR); Hyun-Chul Roh, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/765,400

(22) PCT Filed: Oct. 16, 2014

(86) PCT No.: PCT/KR2014/009752
§ 371 (c)(1),
(2) Date: Aug. 3, 2015

(87) PCT Pub. No.: WO2016/060300
PCT Pub. Date: Apr. 21, 2016

(65) Prior Publication Data
US 2016/0268589 A1    Sep. 15, 2016

(51) Int. Cl.
*H01M 10/052*    (2010.01)
*H01M 4/133*    (2010.01)
(Continued)

(52) U.S. Cl.
CPC .............. *H01M 4/133* (2013.01); *H01M 4/13* (2013.01); *H01M 4/485* (2013.01); *H01M 4/583* (2013.01);
(Continued)

(58) Field of Classification Search
CPC ........................ H01M 10/0525; H01M 10/052
See application file for complete search history.

(56) References Cited

U.S. PATENT DOCUMENTS

| | | | |
|---|---|---|---|
| 6,824,923 B2 | 11/2004 | Che et al. | |
| 2008/0112112 A1* | 5/2008 | Takemura | H01G 11/32 361/502 |

(Continued)

FOREIGN PATENT DOCUMENTS

| | | |
|---|---|---|
| JP | 2001-216962 A | 8/2001 |
| JP | 2002-270175 A | 9/2002 |

(Continued)

OTHER PUBLICATIONS

Lee et al., "Li4Ti5O12—Coated Graphite Anode Materials for Lithium-Ion Batteries", Electrochimica Acta, vol. 112 (2013) pp. 529-534.
(Continued)

*Primary Examiner* — Olatunji Godo
(74) *Attorney, Agent, or Firm* — Birch, Stewart, Kolasch & Birch, LLP

(57) ABSTRACT

The present disclosure refers to an anode for a secondary battery that comprises a low-temperature additive, and an electrochemical device using the anode. More specifically, the present disclosure provides a carbon-based anode material comprising a low-temperature additive such as lithium titanium oxide (LTO) to improve low-temperature output
(Continued)

characteristics, thereby providing high output at room temperature and even a low temperature, and an electrochemical device using the anode.

5 Claims, 3 Drawing Sheets

(51) Int. Cl.
| | |
|---|---|
| H01M 4/13 | (2010.01) |
| H01M 4/485 | (2010.01) |
| H01M 4/62 | (2006.01) |
| H01M 4/583 | (2010.01) |
| H01M 4/66 | (2006.01) |
| H01M 10/0525 | (2010.01) |
| H01M 4/02 | (2006.01) |

(52) U.S. Cl.
CPC .............. *H01M 4/62* (2013.01); *H01M 4/621* (2013.01); *H01M 4/625* (2013.01); *H01M 4/661* (2013.01); *H01M 10/0525* (2013.01); *H01M 2004/027* (2013.01); *H01M 2220/20* (2013.01)

(56) References Cited

U.S. PATENT DOCUMENTS

| | | | | |
|---|---|---|---|---|
| 2010/0021815 | A1* | 1/2010 | Oh | ................... H01M 10/0564 |
| | | | | 429/207 |
| 2011/0027646 | A1 | 2/2011 | Lee et al. | |
| 2011/0086275 | A1* | 4/2011 | Lee | ...................... C01G 23/005 |
| | | | | 429/231.1 |
| 2011/0236759 | A1 | 9/2011 | Uchida | |
| 2011/0274929 | A1* | 11/2011 | Lee | .......................... B32B 5/16 |
| | | | | 428/402 |
| 2012/0100412 | A1* | 4/2012 | Kwon | ..................... H01M 4/75 |
| | | | | 429/149 |
| 2012/0135303 | A1 | 5/2012 | Hong et al. | |
| 2014/0087233 | A1* | 3/2014 | Hong | .................. H01M 2/1686 |
| | | | | 429/144 |

FOREIGN PATENT DOCUMENTS

| | | | |
|---|---|---|---|
| JP | 2003-303585 | A | 10/2003 |
| JP | 2006-66298 | A | 3/2006 |
| JP | 2013-134921 | A | 7/2013 |
| JP | 2014-527267 | A | 10/2014 |
| KR | 10-2008-0112977 | A | 12/2008 |
| KR | 10-0888685 | B1 | 3/2009 |
| KR | 10-1289300 | B1 | 5/2013 |
| WO | WO 2012165758 | * | 12/2012 |

OTHER PUBLICATIONS

Lu et al., "Enhanced Performance of Spherical Natural Graphite Coated by Li4Ti5O12 as Anode for Lithium-Ion Batteries", Journal of Power Sources, vol. 219 (2012) pp. 188-192.

* cited by examiner

ANODE FOR SECONDARY BATTERY COMPRISING ADDITIVE FOR IMPROVING LOW-TEMPERATURE CHARACTERISTICS, AND SECONDARY BATTERY HAVING THE SAME

TECHNICAL FIELD

The present disclosure relates to an anode having good output characteristics at low temperature, more specifically an anode comprising an additive capable of improving low-temperature characteristics including output under low temperature conditions; and a secondary battery having the anode.

BACKGROUND ART

With the increase in the development and use of mobile devices, the demand of secondary batteries as an energy source is growing. Among the secondary batteries, lithium batteries with high energy density and discharge voltage have been actively researched and have been commercially available. Also, recently, with the growing interest in environmental issues, many studies are conducted on electric vehicles (EVs) and hybrid electric vehicles (HEVs) other than vehicles running on fossil fuels, such as gasoline vehicles and diesel vehicles being attributable to air pollution. These electric vehicles and hybrid electric vehicles largely use Ni-metal hydride secondary batteries as a power source, and also lithium secondary batteries having high energy density and discharge voltage are actively researched for their use and have reached commercialization.

The lithium secondary batteries generally comprises an electrode assembly consisting of a cathode, an anode, and a separator interposed therebetween, and a non-aqueous electrolyte solution comprising a lithium salt and being impregnated in the electrode assembly, each of the cathode and the anode having an active material coated on a current collector. As the cathode active material, lithium-containing cobalt oxides, lithium-containing manganese oxides, lithium-containing nickel oxides, lithium composite oxides have been used. As the anode active material, carbon materials have been largely used.

In order for such a lithium secondary battery to be used as a power source of cellular phones, notebook PC and PDA, and further electric vehicles and hybrid electric vehicles, it should be operated even under severe conditions. For example, mobile devices and electric vehicles being used in the outside should be operated at a very low temperature during winter, and therefore the power source thereof is required to have good output characteristics at a low temperature. If the output is insufficient at a low temperature, a power system may be abnormally operated, and it is difficult to reach the minimum output necessary to starting, so making vehicle driving be impossible.

The output of the lithium secondary at a low temperature has been improved by largely modifying an electrolyte solution or an anode material. For example, in a lithium secondary battery used in HEV, amorphous carbon has been adopted as an anode active material so as to improve output at a low temperature. However, such a modification of an active material may change the applicable region of cell voltage or the appearance of voltage profile, thereby deteriorating high-temperature characteristics and reducing battery capacity.

Therefore, there is needed a technique capable of improving low-temperature output characteristics easily without deteriorating high-temperature characteristics and reducing battery capacity

DISCLOSURE

Technical Problem

The present disclosure is designed to solve the above-mentioned problems, and therefore it is an object of the present disclosure to provide an anode material for improving output characteristics at a low temperature and minimizing the damage of high-temperature characteristics and capacity. Also, the present disclosure is to provide an anode comprising the anode material and an electrochemical device having the anode.

Other objects and advantages of the present disclosure will become apparent from the following description. Also, the objects and advantages of the present disclosure will be achieved by manners, methods and a combination thereof, defined in the claims.

Technical Solution

In order to achieve the above object, the present disclosure provides an anode for a secondary battery. The anode for a secondary battery comprises an anode current collector and an anode active material layer formed on at least one surface of the current collector, wherein the anode active material layer comprises an anode active material having a reaction potential (vs. Li$^+$/Li) of 1V or less, and an additive for improving low-temperature characteristics, the additive comprising titanium oxide, lithium titanium oxide (LTO) or a mixture thereof.

The lithium titanium oxide may be a compound of the following formula (I):

$$Li_xTi_yO_z \quad (I)$$

wherein, x, y, and z satisfy and $0.5 \leq x \leq 5$, $1 \leq y \leq 5$, and $2 \leq z \leq 12$.

The lithium titanium oxide may be any one selected from the group consisting of  $Li_{0.8}Ti_{2.2}O_4$, $Li_{2.67}Ti_{1.33}O_4$, $Li_{1.33}Ti_{1.67}O_4$, $Li_{1.14}Ti_{1.71}O_4$, $Li_4Ti_5O_{12}$, $Li_2TiO_3$, $Li_2Ti_3O_7$, and a mixture thereof.

In the present disclosure, the additive for improving low-temperature characteristics may be present in an amount of 2 to 50 wt % based on 100 wt % of the anode active material layer.

The lithium titanium oxide may comprise primary particles, secondary particles being aggregates of the primary particles, or a mixture thereof.

The primary particles of the lithium titanium oxide may have a diameter ($D_{50}$) of 0.01 to 2 μm.

In the lithium titanium oxide, the primary particles may be present in an amount of 50 to 100 wt % based on 100 wt % of the lithium titanium oxide.

The anode active material may comprise at least one selected from the group consisting of: a) low-crystalline carbon and/or high-crystalline carbon materials, b) at least one metal (Me) selected from the group consisting of Si, Sn, Li, Mg, Al, Ca, Ce, Ti, Cr, Mn, Fe, Co, Ni, Cu, Zn, Ga, Ge, Zr, Nb, Pd, Ag, Cd, In, Sb, Pt, Au, Hg, Pb and Bi, and/or an alloy of two or more metals (Me); and c) a composite of a) and b).

Also, the anode active material may further comprise a conductive material and/or a binder resin.

The conductive material may comprise any one selected from the group consisting of polyacetylene, polyaniline, polypyrrole, polythiophene, polysulfurnitride, copper, silver, palladium, nickel, and a mixture thereof.

Further, the present disclosure provides a secondary battery comprising a cathode, an anode, a separator interposed between the cathode and the anode, and an electrolyte solution, wherein the anode is the above-mentioned anode of the present disclosure. The secondary battery operates at a voltage of 2.5V or higher.

Advantageous Effects

In accordance with one aspect of the present disclosure, a carbon-based anode material, which can improve output characteristics at a low temperature and minimize the damage of high-temperature characteristics and capacity, is used in an anode and an electrochemical device. The electrochemical device using such an anode material can be preferably used as a battery with high output and great capacity or a unit battery of a battery pack, and particularly can be used as a power source for vehicles such as electric vehicles and hybrid electric vehicles to provide high output at a low temperature, without a separate internal-combustion engine for heating at a low temperature.

DESCRIPTION OF DRAWINGS

The accompanying drawings illustrate preferred embodiments of the present disclosure and, together with the foregoing disclosure, serve to provide further understanding of the technical spirit of the present disclosure. However, the present disclosure is not to be construed as being limited to the drawings.

BEST MODE

Figure 1:
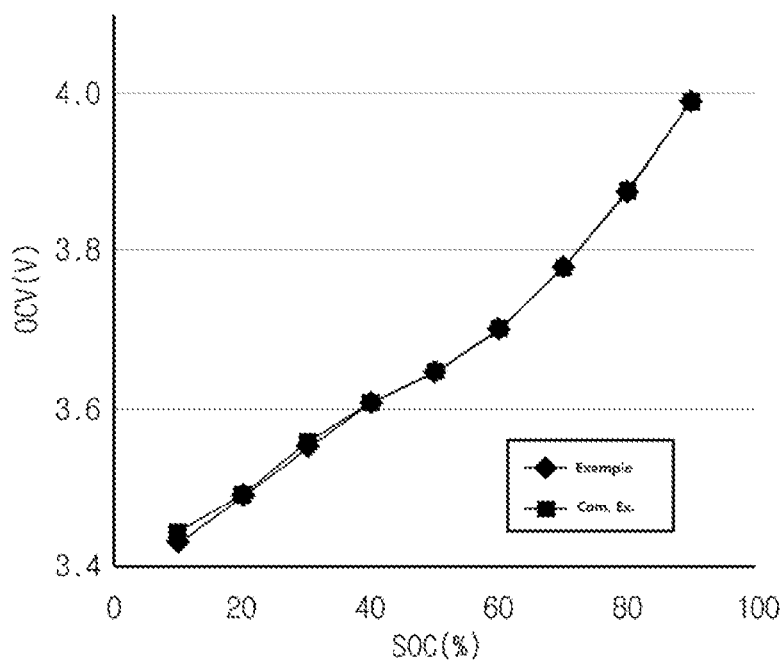
FIG. 1 shows state-of-charge (SOC) and open-circuit voltage (OCV) of batteries prepared in the Example and the Comparative Example of the present disclosure.

Hereinafter, the present disclosure will be described in detail. Prior to the description, it should be understood that the terms used in the specification and the appended claims should be construed as limited to general and dictionary meanings, but interpreted based on the meanings and concepts corresponding to technical aspects of the present disclosure on the basis of the principle that the inventor is allowed to define terms appropriately for the best explanation. Accordingly, the constitutions illustrated in the drawings and the embodiments herein are just preferable examples for the purpose of illustrations only, not intended to limit the scope of the disclosure, so it should be understood that other equivalents and modifications could be made thereto without departing from the spirit and scope of the disclosure.

The present disclosure provides an anode for a secondary battery, comprising an anode current collector and an anode active material layer formed on at least one surface of the current collector, wherein the anode active material layer comprises an additive for improving low-temperature characteristics. In the present disclosure, the additive for improving low-temperature characteristics (or a low-temperature additive) refers to a material and/or component being effective to raise the low-temperature output of batteries without the damage of battery performances, including a decrease in the capacity of a battery when the battery operates under low-temperature conditions. Also, the present invention provides a secondary battery comprising the anode.

In accordance with a specific embodiment of the present disclosure, the additive for improving low-temperature characteristics comprises titanium oxide ($TiO_2$), lithium titanium oxide (LTO) or a mixture thereof, preferably lithium titanium oxide.

The lithium titanium oxide, which is used as one of electrode materials of a lithium battery, can be subjecting to high-rate charging and discharging, undergoes little irreversible reaction (an initial efficiency of 95% or higher), and has very low heat of reaction and good safety. However, it may not be effectively used as an electrode material in a battery for high out, such as a battery for HEVs, because it has a high reaction potential of about 1.5 V ($Li^+/Li$) and a low reversible capacity of about 170 mAh/g.

In a specific embodiment of the present disclosure, the lithium titanium oxide may be a compound of the following formula (I):

$$Li_xTi_yO_z \quad (I)$$

wherein, x, y, and z satisfy $0.5 \leq x \leq 5$, $1 \leq y \leq 5$, and $2 \leq z \leq 12$. The examples of the lithium titanium oxide may include $Li_{0.8}Ti_{2.2}O_4$, $Li_{2.67}Ti_{1.33}O_4$, $Li_{1.33}Ti_{1.67}O_4$, $Li_{1.14}Ti_{1.71}O_4$, $Li_4Ti_5O_{12}$, $Li_2TiO_3$, $Li_2Ti_3O_7$ and mixtures thereof, but are not limited thereto. More specifically, $Li_{1.14}Ti_{1.71}O_4$ or $LiTi_2O_4$ is preferred by virtue of good their spinel structure and a slight change in crystal structures during charging and discharging processes.

The lithium titanium oxide may comprise primary particles, secondary particles being aggregates of the primary particles, or a mixture thereof. In the lithium titanium oxide, the primary particles may be present in an amount of 50 to 100 wt %, preferably 70 to 100 wt %, more preferably 90 to 100 wt %, most preferably 95 to 100 wt %, based on 100 wt % of the lithium titanium oxide.

In the case that the LTO is added in an electrode as the additive for improving low-temperature characteristics, it is used in a smaller amount relative to the case that it is used as an electrode active material, and can provide the better effect of improving low-temperature characteristics when its particles have a larger non-specific surface area. For this reason, the primary particles of LTO are preferable than the secondary particles thereof. Also, in terms of a conductive pass, the primary particles having a smaller diameter are preferable than the secondary particles. The primary particles of LTO have a volume based diameter distribution ($D_{50}$) of 0.01 to 2 μm, more preferably 0.5 to 1.5 μm.

As used herein, the term 'volume based diameter distribution ($D_{50}$)' refers to a diameter of particles whose cumulative volume from smaller particles corresponds to 50% of the total volume.

Also, in one embodiment of the present disclosure, the LTO particles may be porous particles having multiple pores in the body and surface thereof. The pores may be present in both the primary and/or secondary particles.

In a specific embodiment of the present disclosure, the additive for improving low-temperature characteristics may be present in an amount of 2 to 50 wt %, preferably 2 to 30 wt %, more preferably 2 to 10 wt %, most preferably 2 to 5 wt %, based on 100 wt % of the anode active material layer. If the amount of the additive for improving low-temperature characteristics excessively exceeds such range, the unnecessary irreversible reaction increases, and the loading amount of the anode increases.

Figure 2:
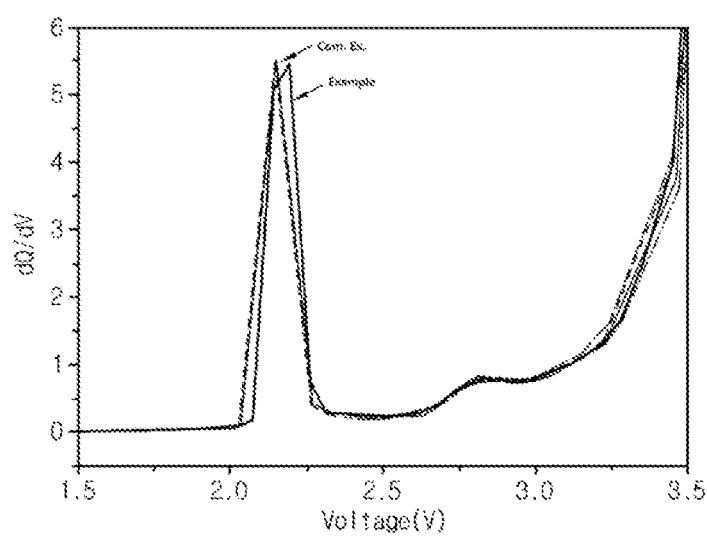
FIG. 2 shows LTO-charging peaks of batteries prepared in the Example and the Comparative Example of the present disclosure.

Generally, lithium ion batteries for HEVs operate at a voltage of 2.5 to 4.5V, and an anode which uses carbon materials such as graphite as an anode active material is designed to have an applicable voltage (reaction potential) of 1.0V or less at which the lithium titanium oxide (LTO), however, is not subject to charging and discharging. That is, in such a lithium ion battery for HEVs, the LTO does not act as an active material and therefore has no influence on inherent properties including SOC and OCV of the battery. As attached herewith, FIG. 1 shows plotting of OCV to SOC of batteries prepared in the Example and the Comparative Example. In FIG. 1, the battery of Example 1 exhibits substantially similar pattern to that of Comparative Example. Also, FIG. 2 shows a graph plotting the value of dQ/dV to each voltage, in which batteries of the Example and the Comparative Example exhibit similar patterns.

Figure 3:
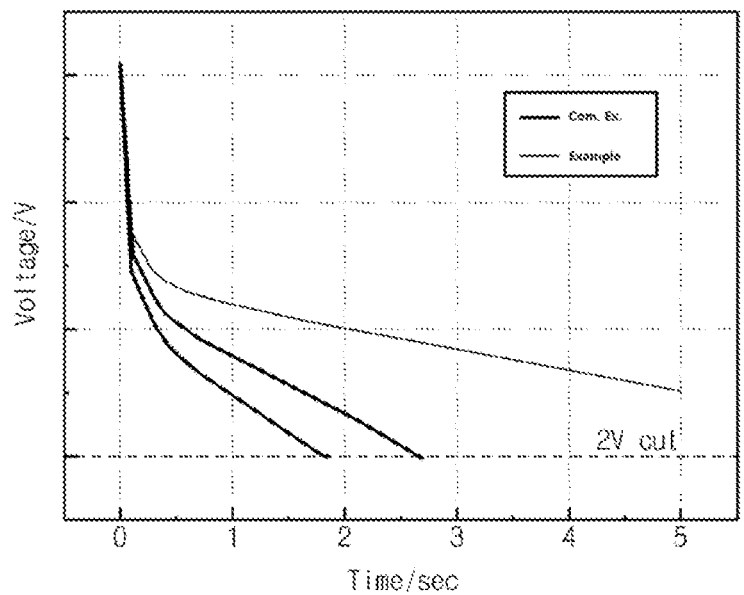
FIG. 3 is a graph showing the effect of improving low-temperature output for batteries prepared in the Example and the Comparative Example of the present disclosure.
Figure 4:
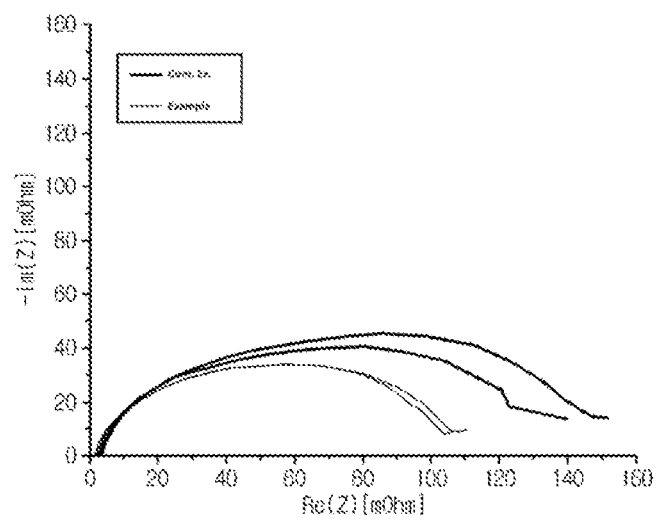
FIG. 4 is a graph plotting the results of charge transfer resistance measured under low temperature conditions for batteries prepared in the Example and the Comparative Example of the present disclosure.
Figure 5:
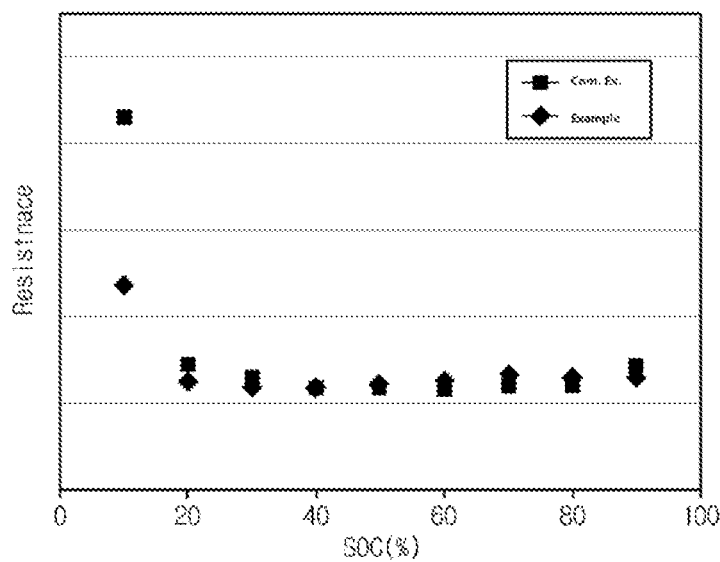
FIG. 5 is a graph plotting the results of output at a high temperature for batteries prepared in the Example and the Comparative Example of the present disclosure.
Figure 6:
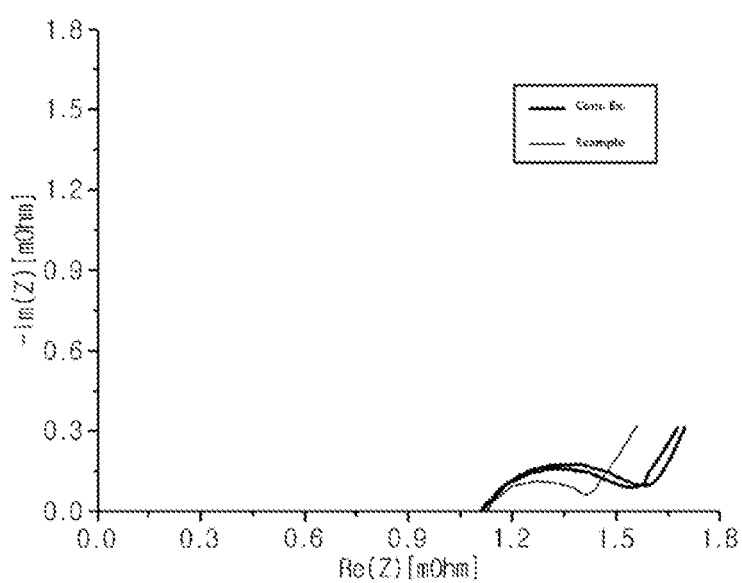
FIG. 6 is a graph showing the results that the battery of the Example exhibits an improved effect in charge transfer resistance at room temperature, as compared with the battery of the Comparative Example.

However, when the LTO is added as the additive for improving low-temperature characteristics, a trace amount of the LTO is discharged by the application of overvoltage to the anode during discharging with a high C-rate at a low temperature. From this result, the profile of discharging at a low temperature has a slow grade to provide an effect of improving low-temperature output, as shown in FIGS. 3 and 4. Also, the LTO has high conductivity and large non-specific area to lower charge transfer resistance at room temperature or a low temperature, thereby improving the output of the battery, as shown in FIGS. 5 and 6. Further, the LTO has high conductivity, good stability and excellent low-temperature characteristics, and also it is metal oxide particles having a 3-dimensional structure, so its volume expansion is very slight to provide excellent cycle life. By virtue of such properties, the LTO is mixed with an anode material to increase the conductivity of the anode and lower the charge transfer resistance of the battery, thereby improving output at room temperature and a low temperature.

In a specific embodiment of the present disclosure, the anode active material is a material capable of intercalating and disintercalating lithium ions and has a reaction potential (vs. $Li^+/Li$) lower than that of the LTO. For example, the anode active material has a reaction potential (vs. $Li^+/Li$) of 1V or less.

In a preferred embodiment of the present disclosure, the anode active material may employ carbon materials, lithium, lithium alloys, silicon, silicon alloys, tin, tin alloys, metal oxides such as $SnO_2$, or the like.

In a preferred embodiment of the present disclosure, the anode active material may comprise a carbon material, including low-crystalline carbon and high-crystalline carbon. Representative examples of the low-crystalline carbon include soft carbon and hard carbon, and representative examples of the high-crystalline carbon include natural graphite, Kish graphite, graphite, pyrolytic carbon, mesophase pitch based carbon fiber, meso-carbon microbeads, mesophase pitches, and high-temperature sintered carbon such as petroleum or coal tar pitch derived cokes.

In the present disclosure, the carbon material preferably has a non-specific area of 10 $m^2/g$ or less. If the non-specific area of the carbon material exceeds 10 $m^2/g$, the initial efficiency of the anode may decrease. In the present disclosure, the lower limit of the non-specific area for the carbon material is not particularly limited. The preferred lower limit may be 2 $m^2/g$, but this value is a simple example, not to limit the present disclosure.

Also, the carbon material has a diameter of 5 to 100 μm, preferably 5 to 40 μm. If the diameter of the carbon material is less than 5 μm, the initial efficiency of the anode may decrease owing to the finest powder of the carbon material. If the diameter of the carbon material is higher than 100 μm, the processability becomes poor during the coating of an anode slurry, and scratches on electrodes may increase.

According to another specific embodiment of the present disclosure, the anode active material may be at least one metal (Me) selected from the group consisting of Si, Sn, Li, Mg, Al, Ca, Ce, Ti, Cr, Mn, Fe, Co, Ni, Cu, Zn, Ga, Ge, Zr, Nb, Pd, Ag, Cd, In, Sb, Pt, Au, Hg, Pb and Bi, and/or an alloy of two or more metals (Me); and a composite of any one of the metal and/or the alloy and the carbon material.

In the present disclosure, the anode active material may be present in an amount of 50 to 95 wt %, preferably 70 wt % or more, based on 100 wt % of the anode active material layer.

Also, the anode of a secondary battery according to the present disclosure may further comprise a conductive material and/or a binder resin.

The conductive material may comprise any one selected from the group consisting of carbon black, acetylene black, ketjen black, carbon fiber, polyacetylene, polyaniline, polypyrrole, polythiophene, polysulfurnitride, copper, silver, palladium, nickel, and a mixture thereof, but is not limited thereto. Also, the conductive material may be present in an amount of 0.1 to 10 wt %, preferably 0.5 to 2 wt %, based on 100 wt % of the anode active material layer.

The binder resin may be various kinds of polymer resins including polyvinylidene fluoride-co-hexafluoro propylene (PVDF-co-HFP), polyvinylidene fluoride, polyacrylonitrile, polyacrylic acid, polymethyl methacrylate, styrene butadiene rubber (SBR). The binder resin may be present in an amount of 0.1 to 10 wt % based on 100 wt % of the anode active material layer.

In addition, the composition for forming the anode of the present disclosure may further comprise a thickener. The thickener may be carboxymethyl cellulose, but is not particularly limited thereto.

The present disclosure provides a secondary battery that comprises the anode according to the present disclosure. The secondary battery operates at a voltage of 2.5 to 4.5 V. The secondary battery comprises a cathode, an anode, a separator interposed between the cathode and the anode, and an electrolyte solution. Besides the anode according to the present disclosure, the cathode, the separator and the electrolyte solution may be those which have been conventionally used in the preparation of a lithium secondary battery.

The non-aqueous electrolyte solution comprises an ionizable lithium salt and an organic solvent. The lithium salt used as an electrolyte in the non-aqueous electrolyte solution may be any one which is conventionally used in an electrolyte solution for a lithium secondary battery. For example, an anion of the lithium salt may be any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$.

The organic solvent used in the non-aqueous electrolyte solution may be any one which is conventionally used in an electrolyte solution for a lithium secondary battery, for example, ethers, esters, amides, linear carbonates, cyclic carbonates, and a mixture thereof. Among these, a linear carbonate, a cyclic carbonate, or a mixture thereof is representatively used. The cyclic carbonate may be selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, a halide thereof and a mixture thereof. The linear carbonate may be selected from the group consisting of dimethyl carbonate (DMC), diethyl carbonate (DEC), dipropyl carbonate, ethyl methyl carbonate (EMC), methyl propyl carbonate, ethyl propyl carbonate and a mixture thereof, but is not limited thereto. In particular, among the above carbonate-based organic solvents, the cyclic carbonates such as ethylene carbonate and propylene carbonate have a high viscosity and a high dielectric constant to more easily dissociate a lithium salt in an electrolyte. Such a cyclic carbonate may be mixed with a linear carbonate with low viscosity and low dielectric constant such as dimethyl carbonate and diethyl carbonate in a suitable ratio to provide an electrolyte solution with a high electric conductivity. Also, the ether which may be used as the organic solvent is any one selected from the group consisting of dimethyl ether, diethyl ether, dipropyl ether, methyl ethyl ether, methyl propyl ether, ethyl propyl ether and a mixture thereof, but is not limited thereto. In addition, the ester which may be used as the organic solvent is any one selected from the group consisting of methyl acetate, ethyl acetate, propyl acetate, methyl propionate, ethyl propionate, γ-butyrolactone, γ-valerolactone, γ-caprolactone, σ-valerolactone, ε-caprolactone and a mixture thereof, but is not limited thereto.

Also, the cathode and the separator of the battery may be those which are conventionally used in the preparation of a lithium secondary battery.

More specifically, the cathode active material is preferably a lithium-containing transition metal oxide, for example, any one selected from the group consisting of $Li_xCoO_2$ (0.5<x<1.3), $Li_xNiO_2$ (0.5<x<1.3), $Li_xMnO_2$ (0.5<x<1.3), $Li_xMn_2O_4$ (0.5<x<1.3), $Li_x(Ni_aCo_bMn_c)O_2$ (0.5<x<1.3, 0<a<1, 0<b<1, 0<c<1, a+b+c=1), $Li_xNi_{1-y}Co_yO_2$ (0.5<x<1.3, 0<y<1), $Li_xCo_{1-y}Mn_yO_2$ (0.5<x<1.3, 0≤y<1), $Li_xNi_{1-y}Mn_yO_2$ (0.5<x<1.3, 0≤y<1), $Li_x(Ni_aCo_bMn_c)O_4$ (0.5<x<1.3, 0<a<2, 0<b<2, 0<c<2, a+b+c=2), $Li_xMn_{2-z}Ni_zO_4$ (0.5<x<1.3, 0<z<2), $Li_xMn_{2-z}Co_zO_4$ (0.5<x<1.3, 0<z<2), $Li_xCoPO_4$ (0.5<x<1.3), $LixFePO_4$ (0.5<x<1.3), and a mixture thereof.

The lithium-containing transition metal oxide may be coated with a metal such as aluminum (Al) and a metal oxide. In addition, lithium-containing transition metal sulfide, selenide, or halide may also be used.

In the composition for forming the cathode, the binder used in the anode may also be used.

Also, the separator may be obtained from a porous polymer film which is conventionally used alone or in the form of lamination in conventional separators, for example, porous polymer films made of polyolefin-based polymers such as ethylene homopolymer, propylene homopolymer, ethylene/butene copolymer, ethylene/hexene copolymer and ethylene/methacrylate copolymer. Also, as the separator, conventional porous non-woven fabrics such as a non-woven fabric made of glass fiber having a high melt point or polyethylene terephthalate fiber may be used, but is not limited thereto.

The lithium secondary battery of the present invention is not limited to its shape, but may be a cylindrical shape using a can, a prismatic shape, a pouch shape or a coin shape.

In one embodiment of the present disclosure, the secondary battery may be a lithium ion battery for a hybrid electric vehicle (HEV). In the HEV, the battery assists the engine output, and the conventional HEVs used Ni/MH batteries as such a battery, but the use of the Ni/MH batteries have decreased from 2011 and the Ni/MH batteries have been replaced with lithium ion batteries having a relatively high energy density. However, there is still a problem that the lithium ion batteries for HEVs should satisfy output at a low temperature. For this, the lithium ion battery of the present disclosure comprises an additive for improving low-temperature characteristics, thereby preventing the decrease of output under low temperature conditions.

MODE FOR DISCLOSURE

Hereinafter, preferred examples of the present disclosure will be described in detail for better understanding. However, the examples of the present disclosure may be modified in various ways, and they should not be interpreted as limiting the scope of the invention. The examples of the present disclosure are just for better understanding of the invention to persons having ordinary skill in the art.

Example 27 g of round natural graphite as an anode active material, 3 g of LTO (Posco ESM, T30 grade) and 0.6 g of carbon black as a conductive material, 0.7 g of water-based SBR as a binder, and 3 g of LTO were mixed, and the mixture was added to a water-based solvent (water) to obtain an anode slurry. The obtained anode slurry was coated on one surface of a copper current collector, followed by drying at 60° C. for 24 hours, to prepare a 13.33 cm²-sized anode. To a non-aqueous electrolyte solvent being a mixture of ethylene carbonate (EC), dimethyl carbonate (DMC) and ethyl methyl carbonate (EMC) in a volume ratio of 3:4:3, $LiPF_6$ was added to obtain a 1M solution of $LiPF_6$. As a cathode, 100% NMC 622 ($LiNi_{0.6}Mn_{0.2}Co_{0.2}O_2$) was used, and a polyolefin separator was interposed between the cathode and the anode, and the electrolyte solution was introduced therein, to prepare a pouch-type mono cell.

Comparative Example 30 g of round natural graphite as an anode active material, 0.6 g of carbon black as a conductive material, and 0.7 g of water-based SBR as a binder were mixed, and the mixture was added to a water-based solvent (water) to obtain an anode slurry. The obtained anode slurry was coated on one surface of a copper current collector, followed by drying at 60° C. for 1 day, to prepare a 13.33 cm²-sized anode. To a non-aqueous electrolyte solvent being a mixture of ethylene carbonate (EC), dimethyl carbonate (DMC) and ethyl methyl carbonate (EMC) in a volume ratio of 3:4:3, $LiPF_6$ was added to obtain a 1M solution of $LiPF_6$. As a cathode, 100% NMC 622 ($LiNi_{0.6}Mn_{0.2}Co_{0.2}O_2$) was used, and a polyolefin separator was interposed between the cathode and the anode, and the electrolyte solution was introduced therein, to prepare a pouch-type mono cell.

Experimental Examples

The batteries of the Example and the Comparative Example were charged with a constant current up to 4 V, and continued with a constant voltage of 4 V until the current reached 0.1 C. Then, discharging was conducted with a constant current up to 2.8 V.

<Evaluation of OCV and SOC Characteristics>

FIG. 1 shows OCV to SOC of the batteries of the Example and the Comparative Example, and FIG. 2 shows charging peaks of batteries of the Example and the Comparative Example. From FIGS. 1 and 2, it was confirmed that the battery of the Example using LTO as an additive for improving low-temperature characteristics was fully charged during the formation process of initial battery preparation, similar to the Comparative Example (FIG. 2), did not operate during its charge and discharge. Also, as to OCV and SOC, there is little difference between the Example and the Comparative Example.

<Effect of Improving Low-Temperature Output>

FIG. 3 shows that the battery of the Example exhibited improvement in low-temperature characteristics, as compared that of the Comparative Example. FIG. 4 shows that the battery of the Example exhibited improvement in current transfer resistance at a low temperature, as compared that of the Comparative Example. In the battery of the Example wherein LTO was added as the additive for improving low-temperature characteristics, a trace amount of the LTO was discharged by the application of overvoltage to the anode during discharging with a high C-rate at a low temperature, and from this result, the profile of discharging at a low temperature exhibited a slow grade to provide an effect of improving low-temperature output.

<Effect of Improving Low-Temperature Output>

FIGS. 5 and 6 show that the battery of the Example exhibited improvement in output at room temperature, as compared with that of the Comparative Example. In the battery of the Example, the charge transfer resistance was lowered to greatly enhance output, as compared with that of the Comparative Example. Particularly, the battery of the Example exhibited greatly improvement in output under the condition of a low SOC at room temperature, as compared with that of the Comparative Example.

What is claimed is:

1. An anode for a secondary battery, comprising
an anode current collector; and
an anode active material layer formed on at least one surface of the current collector,
wherein the anode active material layer comprises an anode active material having a reaction potential (vs. Li$^+$/Li) of 1V or less, and an additive for improving low-temperature characteristics, the additive comprising lithium titanium oxide (LTO) or a mixture of lithium titanium oxide and titanium oxide,
wherein
the lithium titanium oxide is a compound of the following formula (I):

$$Li_xTi_yO_z \quad\quad (I)$$

wherein, x, y, and z satisfy 0.5≤x≤5, 1≤y≤5, and 2≤z≤12,
the additive for improving low-temperature characteristics is present in an amount of 2 to 10 wt % based on 100 wt % of the anode active material layer,
the anode comprises, as an anode active material, one or more selected from the group consisting of soft carbon, hard carbon, Kish graphite, pyrolytic carbon, mesophase pitch based carbon fiber, meso-carbon microbeads, mesophase pitches, petroleum or coal tar pitch derived cokes, and mixtures thereof,
wherein the lithium titanium oxide is any one selected from the group consisting of $Li_{0.8}Ti_{2.2}O_4$, $Li_{2.67}Ti_{1.33}O_4$, $Li_{1.33}Ti_{1.67}O_4$, $Li_{1.14}Ti_{1.71}O_4$, $Li_2Ti_3O_7$, $LiTi_2O_4$ and a mixture thereof, and
wherein the lithium titanium oxide comprises primary particles, secondary particles being aggregates of the primary particles, or a mixture thereof.

2. The anode of claim 1, wherein the primary particles of the lithium titanium oxide may have a diameter ($D_{50}$) of 0.01 to 2 μm.

3. The anode of claim 1, wherein the anode active material further comprises a conductive material and/or a binder resin.

4. The anode of claim 3, wherein the conductive material comprises any one selected from the group consisting of polyacetylene, polyaniline, polypyrrole, polythiophene, polysulfurnitride, copper, silver, palladium, and a mixture thereof.

5. A secondary battery, comprising a cathode, an anode, a separator interposed between the cathode and the anode, and an electrolyte solution,
wherein the anode is defined in claim 1,
wherein the cathode comprises one or more mixture selected from a group consisting of $Li_xCoO_2$ (0.5<x<1.3), $Li_xNiO_2$ (0.5<x<1.3), $Li_xMnO_2$ (0.5<x<1.3), $Li_xMn_2O_4$ (0.5<x<1.3), $Li_x(Ni_aCo_bMn_c)O_2$ (0.5<x<1.3, 0<a<1, 0<b<1, 0<c<1, a+b+c=1), $Li_xNi_{1-y}Co_yO_2$ (0.5<x<1.3, 0<y<1), $Li_xCo_{1-y}Mn_yO_2$ (0.5<x<1.3, 0≤y≤1), $Li_xNi_{1-y}Mn_yO_2$ (0.5<x<1.3, 0≤y<1), $Li_x(Ni_aCo_bMn_c)O_4$ (0.5<x<1.3, 0<a<2, 0<b<2, 0<c<2, a+b+c=2), $Li_xMn_{2-z}Ni_zO_4$ (0.5<x<1.3, 0<z<2), $Li_xMn_{2-z}Co_zO_4$ (0.5<x<1.3, 0<z<2), $Li_xCoPO_4$ (0.5<x<1.3) and $Li_xFePO_4$ (0.5<x<1.3) as a cathode active material and the battery is being operated at a voltage of 2.5V or higher.

* * * * *